United States Patent
Anantharaman et al.

(10) Patent No.: US 8,112,480 B2
(45) Date of Patent: Feb. 7, 2012

(54) SIGNALING SUPPORT FOR SHARER SWITCHING IN APPLICATION SHARING

(75) Inventors: Sundar Anantharaman, Redmond, WA (US); Pradipta Kumar Basu, Redmond, WA (US); Deepak P. Rao, Bellevue, WA (US); Calin M. Popa, Bothell, WA (US); Dhruv Chopra, Bellevue, WA (US); Rastan V. Boroujerdi, Bellevue, WA (US); Aidan R. Downes, Seattle, WA (US); Michael K. W. Tsu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 12/354,792

(22) Filed: Jan. 16, 2009

(65) Prior Publication Data

US 2010/0185956 A1  Jul. 22, 2010

(51) Int. Cl.
*G06F 15/16* (2006.01)

(52) U.S. Cl. ........ 709/205; 709/201; 709/202; 709/204; 709/220; 709/222; 709/227; 709/228; 709/229

(58) Field of Classification Search .................. 709/205, 709/227, 201, 202, 204, 220, 222, 228, 229
See application file for complete search history.

(56) References Cited

U.S. PATENT DOCUMENTS

| | | | |
|---|---|---|---|
| 5,539,886 A | 7/1996 | Aldred et al. | |
| 5,802,220 A * | 9/1998 | Black et al. | 382/276 |
| 5,930,473 A * | 7/1999 | Teng et al. | 709/204 |
| 7,028,266 B2 * | 4/2006 | Ben-Shachar et al. | 715/790 |
| 7,167,182 B2 | 1/2007 | Butler | |
| 7,437,412 B2 | 10/2008 | Ludwig et al. | |
| 7,624,188 B2 * | 11/2009 | Koskelainen | 709/229 |
| 7,920,158 B1 * | 4/2011 | Beck et al. | 348/14.08 |
| 2003/0217171 A1 * | 11/2003 | Von Stuermer et al. | 709/231 |
| 2004/0103152 A1 * | 5/2004 | Ludwig et al. | 709/205 |
| 2005/0007965 A1 * | 1/2005 | Hagen et al. | 370/260 |
| 2005/0102360 A1 * | 5/2005 | Chavis et al. | 709/205 |
| 2005/0132299 A1 | 6/2005 | Jones et al. | |
| 2005/0207664 A1 * | 9/2005 | Ramasastry et al. | 382/240 |
| 2006/0294598 A1 * | 12/2006 | Lam et al. | 726/28 |
| 2008/0005236 A1 | 1/2008 | Schmieder | |
| 2008/0069011 A1 | 3/2008 | Sekaran et al. | |
| 2008/0184122 A1 * | 7/2008 | Grant et al. | 715/723 |
| 2010/0149303 A1 * | 6/2010 | Thorne et al. | 348/14.08 |

OTHER PUBLICATIONS

Watabe, et al., "Distributed Multiparty Desktop Conferencing System: MERMAID", CSCW Proceedings 1990, retrieved at <<http://portal.acm.org/ft_gateway.cfm?id=99338&type=pdf&coll=GUIDE&dl=GUIDE&CFID=10027433&CFTOKEN=72096578>>, Oct. 1990.

(Continued)

*Primary Examiner* — Liangche A Wang

(57) ABSTRACT

Architecture for seamless role switching in application sharing. A multipoint control unit (MCU) can be used for connecting multiple clients over a network. An application sharing component establishes an application sharing session over the MCU, and application content is exchanged from a sharer client to one or more viewer clients. Each client can communicate a media connection preference to the session. Client sharer and viewer roles are defined during creation of the application sharing session. A client can seamlessly switch roles during the session from a viewer to a sharer, and vice-versa, so that different application content can be shared to the session viewers. The session can be restricted to only one sharer so that the viewing clients view one sharer client at a time.

20 Claims, 14 Drawing Sheets

OTHER PUBLICATIONS

Ahuja, et al., "A Comparison of Application Sharing Mechanisms in Real-Time Desktop Conferencing Systems", retrieved at <<http://delivery.acm.org/10.1145/100000/91549/p238-ahuja.pdf?key1=91549&key2=3506046221&coll=GUIDE&dl=GUIDE&CFID=10364819&CFTOKEN=13550206>>, ACM, 1990, pp. 238-248.

Gajewska, et al., "Argo: A System for Distributed Collaboration", retrieved at <<http://www.std.org/~msm/common/gajarg.pdf>>.

"Increase Productivity with Desktop Multimedia Conferencing", retrieved at <<http://www.radvision.ru/files/download/new/iVIEWDesktopDatasheet.pdf>>.

* cited by examiner

SIGNALING SUPPORT FOR SHARER SWITCHING IN APPLICATION SHARING

BACKGROUND

Application sharing is a useful tool for allowing a user to share and view another user's application and desktop. Typically, a shared application or document is running on a sharer client, which is a host computer that feeds the shared content to a network. The shared content is then viewed remotely by one or more viewer clients, which receive the shared content over a network connection.

Remote desktop protocol (RDP) is a multi-channel protocol that enables users to connect to a networked computer, and is typically used for application and/or desktop sharing. The RDP packets are exchanged by tunneling, as used in accordance with the real-time transport protocol (RTP) which defines a standardized packet format for Internet delivery of audio and video content.

For signaling in application sharing, a problem exists in negotiating support for multiple media types. In a network that exchanges RDP packets, the server component of a web access viewer client cannot process or support the RDP natively. In those scenarios, the server component of the web access client can only support certain formats, for example, MIME formats such as JPEG. However, clients residing on the network can support RDP natively in both the sharer or viewer role. Thus, the client cannot receive unsupported content from an application sharing multipoint control unit if unable to support or process RDP natively.

In another problem, during a multiparty application sharing conference, there can be only one sharer though there can be multiple viewers. The roles of sharer and viewer are defined for each client at the beginning of an application sharing session. However, current systems do not allow multiple sharers in the same session. In order for viewers to view an application from a different sharer, a new application sharing session is established, which entails additional effort.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, architecture is disclosed for establishing an application sharing session between multiple clients and establishing a media connection of a client to the session. The media connection is established based on supported media information communicated between a media component and the client. The multiple clients include either network clients and/or web-access clients, for example. The supported media information can include a preferred media type in which to establish the connection. The preferred media type can include a format selected from a set of formats having different attributes. The preferred media type can be communicated as part of an initial invite. A negotiation component facilitates role negotiation of a client as a sharer or a viewer. A restriction component restricts a role in a peer-to-peer session to only one sharer. The media component can establish a default view channel for communicating application sharing media to the clients. The media component also can stream a most current sharer media to viewers of the session. Additionally, the media component can be a multipoint control unit or a peer-to-peer client communication component.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
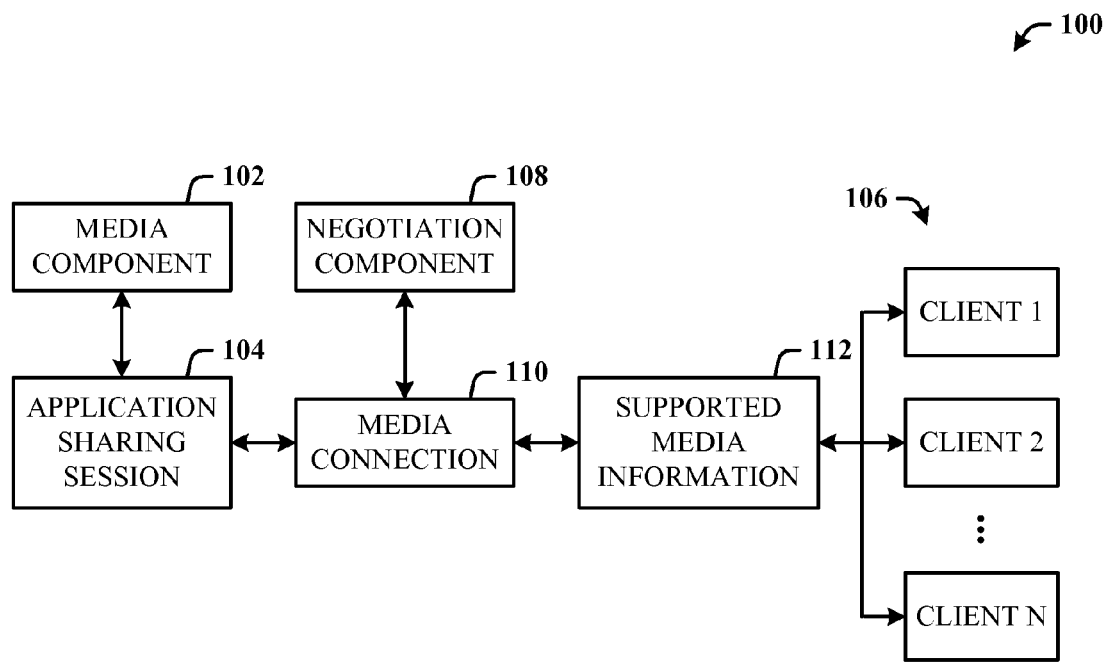
FIG. 1 illustrates a computer-implemented system for performing application sharing.

The disclosed architecture facilitates various aspects of application sharing. A multipoint control unit (MCU) can be used for connecting multiple clients over a network or externally, for example, over the Internet. An application sharing component establishes an application sharing session over the MCU, and application content is exchanged from a sharer client to one or more viewer clients. One technique enables multiple types of clients to negotiate a preferred (a user preference) media type or the only means of supporting application sharing formats.

Another aspect is to enable a client to seamlessly switch its role from a viewer to a sharer or vice-versa within the same application sharing session. The sharer and viewer roles for each client are defined during establishment of the application sharing session. During the application sharing session, a switch is performed from the sharer client to a different sharer client so that different application content is shared to the viewers. Since viewers can only view one sharer at a time, the session is restricted to only one active sharer, so that the viewing clients view one sharer client at a time. Additionally, since viewers tend to leave a conference as soon as the sharer leaves, the sharer switch is performed seamlessly before viewers leave the conference.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented communications system 100 for sharer switching in an application sharing environment. The system 100 includes a media component 102 for establishing an application sharing session 104 between multiple clients 106. For application sharing, signaling and session establishment can be accomplished using the session initiation protocol (SIP), a signaling protocol commonly used to establish a variety of different types of multimedia communication sessions. Session establishment in SIP can be accomplished using the session description protocol (SDP), a format in which initialization parameters for steaming media are described in an ASCII (American standard code for information exchange) string.

As illustrated in FIG. 1, the system 100 can further include a negotiation component 108 for establishing a media connection 110 for one or more of the clients 106 to the session 104. The media connection 110 can be established based on supported media information 112 communicated between the media component 102 and a client. For example, if a web client can only support image files in a JPEG point photographic experts group) format, the media component 102 only sends shared content in the JPEG format. Alternatively, for shared audio content, the supported format can be based on differences in encoding, compression, or lossiness.

Figure 2:
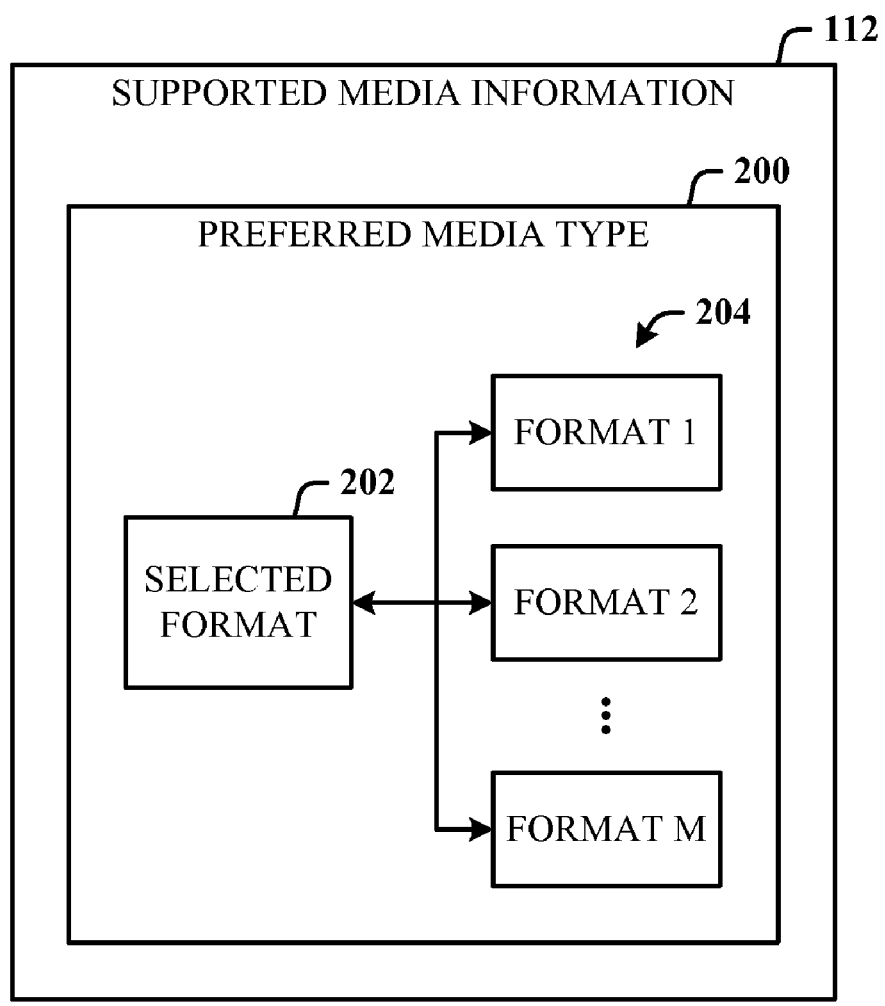
FIG. 2 illustrates aspects of supported media information as used with the computer-implemented system for performing application sharing.

FIG. 2 illustrates aspects of the supported media information 112 as used with the system 100 for performing application sharing. The supported media information 112 can include a preferred media type 200 in which to establish the media connection 110. The preferred media type 200 can include a format 202 selected from a set of formats 204 having different attributes. The preferred media type 200 can be communicated to one or more of the clients 106 as part of an initial invite prior to establishing the application sharing session 104.

Figure 3:
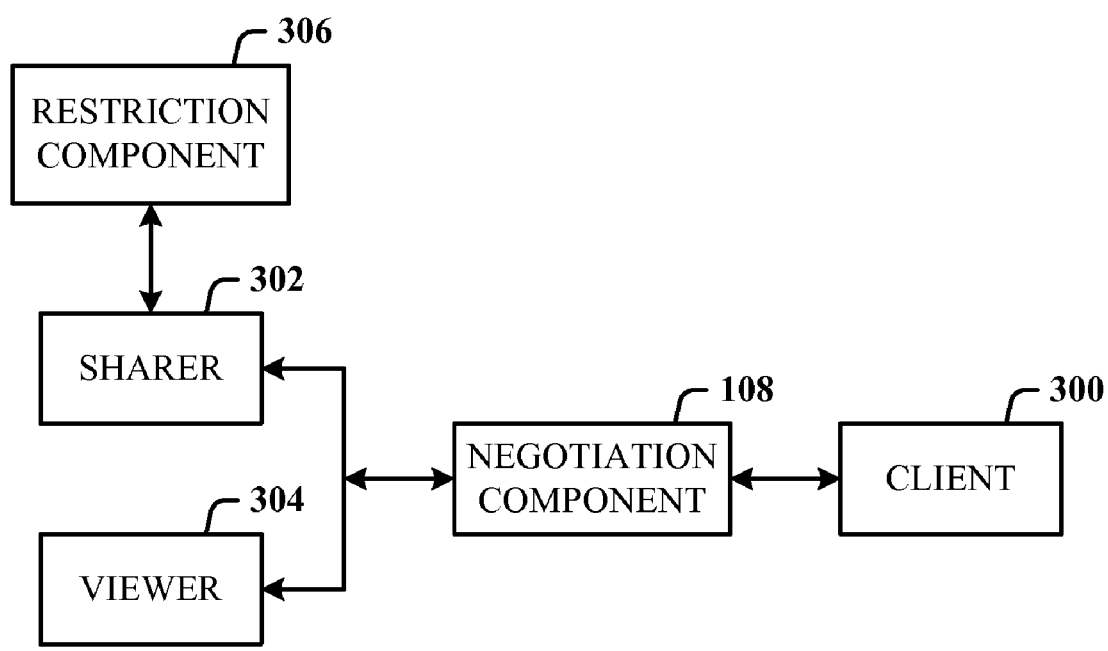
FIG. 3 illustrates a negotiation component as employed to define a client as a sharer or viewer.

FIG. 3 illustrates the negotiation component 108 as employed to facilitate role negotiation of a client 300 as a sharer 302 or viewer 304. A sharer is a client that is actively sharing an application or desktop while a viewer is a client that is viewing the application or desktop shared by the sharer client. Since the server component for web-based clients cannot process or support the remote desktop protocol (RDP) natively when the web client is a viewer, the negotiation component 108 negotiates with the client 300 regarding capabilities of the client for supporting and processing RDP natively. During session establishment, the preference of the client is encoded in an SDP offer or an SDP answer as an attribute. The name of the newly-introduced SDP attribute can be, for example, "x-application-sharing-media-type", which lists all the supported media types for application sharing. The SDP offer from the negotiation component 108 lists all its supported media types, and presents the types in a space-separated string value for this attribute in the SDP. The SDP answer from the client 300 lists only the supported media type the client prefers. Enabling different types of network clients and web-access clients to communicate and negotiate associated application sharing support requirements enables the roles of the sharer 302 and the viewer 304 to be defined at the establishment of the session 104.

As illustrated in FIG. 3, the system 100 includes a restriction component 306 for restricting a role in a peer-to-peer session to only one sharer. In a multiparty application sharing conference there can be only one sharer though there can be multiple viewers. The restriction component 306 restricts the session to only one active sharer 302. With the system 100, the client 300 can switch its role from the viewer 304 to the sharer 302, and vice-versa. In switching between two clients, one the active sharer 302, and the other client seeking to become the active sharer 302, the session experience for viewers is seamless to avoid the situation where viewers leave the conference as soon as the current sharer leaves and before the other client can become the active sharer.

Figure 4:
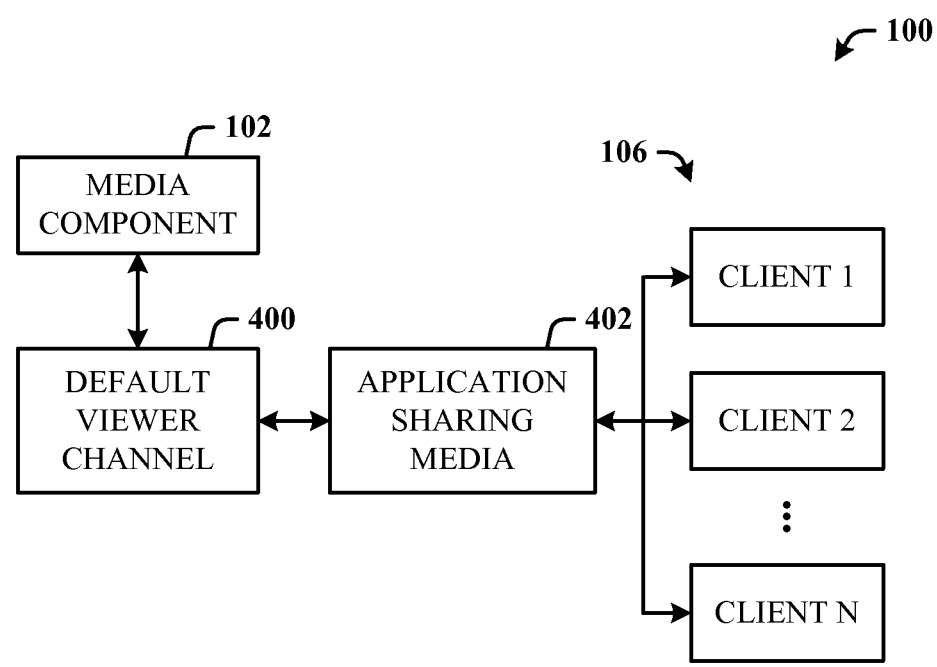
FIG. 4 illustrates a media component as used with the system for performing application sharing.

FIG. 4 illustrates the media component 102 as used with the system 100 for performing application sharing. The media component 102 establishes a default viewer channel 400 for communicating application sharing media 402 to the clients 106. The default viewer channel 400 provides a single conduit through which viewer clients receive application sharing media 402. The media component 102 can be an application sharing multipoint control unit (MCU) that switches sharer media streamed into the viewer channel 400 from a previous sharer when a new sharer joins the conference, so that the viewers see the desktop or application being shared by the new sharer. A focus component provides conference notifications to the viewers and sends a document to inform the viewers of the conference about the new sharer before the exit of the previous sharer. This alerts the viewers that the session is not over, and to not leave the conference. The focus component creates conferences in response to a request from a scheduling client (a client application that handles creation, modification, or deletion of a conference). When the previous sharer is ejected from the conference by the MCU, the previous sharer is notified of the proper reason for ejection.

Figure 5:
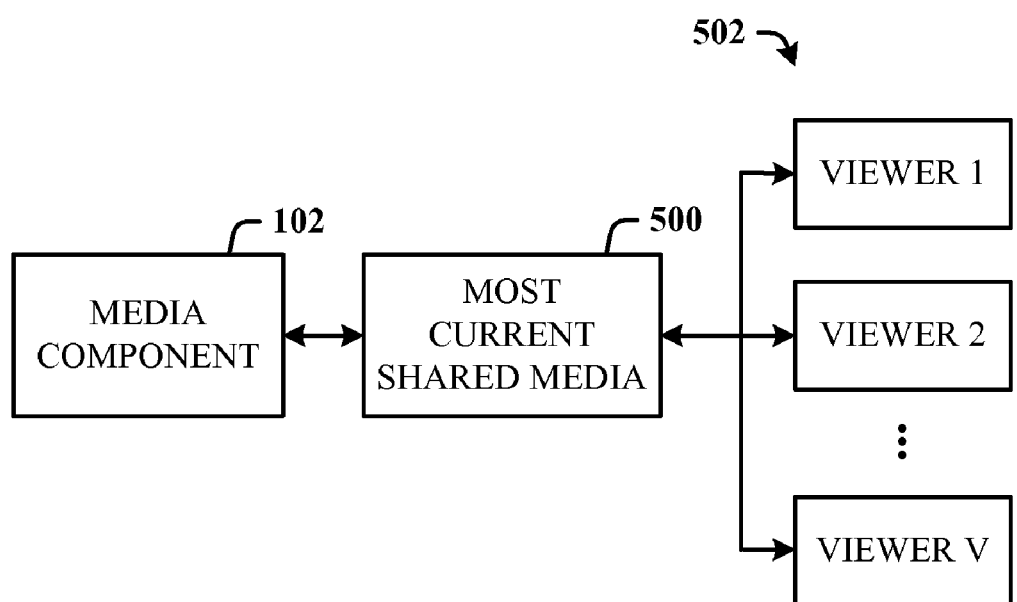
FIG. 5 illustrates additional aspects of the media component as used for performing application sharing.

FIG. 5 illustrates additional aspects of the media component 102 as used for performing application sharing. The media component 102 streams a most current sharer media 500 to viewers 502 of the session. It is to be appreciated that the media component 102 can include the application sharing MCU. Alternatively, the media component 102 can be a peer-to-peer client communication component for directly connecting two or more client devices.

Figure 6:
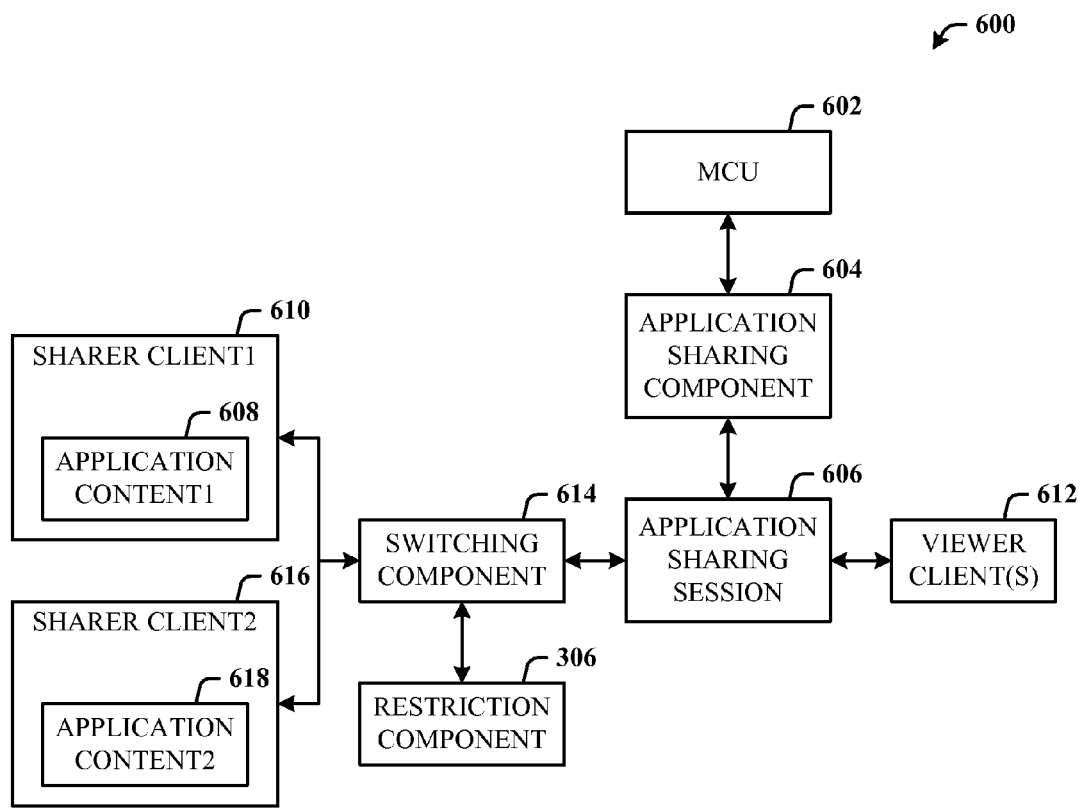
FIG. 6 illustrates an alternate embodiment of a system for performing application sharing.

FIG. 6 illustrates an alternate embodiment of a system 600 for performing application sharing. An MCU 602 is provided for connecting multiple clients (e.g., a sharer client and viewer clients). The MCU 602 functions as a mixer for receiving shared application content and fanning the content out to one or more viewers. An application sharing component 604 establishes an application sharing session 606 (similar to session 104 of FIG. 1) via the MCU 602 to exchange application content 608 from a first sharer client 610 (Sharer Client1) to one or more viewer client(s) 612.

A switching component 614 enables seamless switching of the sharer role from the first sharer client 610 to a second sharer client 616 (Sharer Client2) that exchanges a different application content 618 to the viewer client(s) 612 during the application sharing session 606. The restriction component 306 restricts the application sharing session 606 to a single active sharer client so that the one or more viewer client(s) 612 perceive one sharer client at a time.

Figure 7:
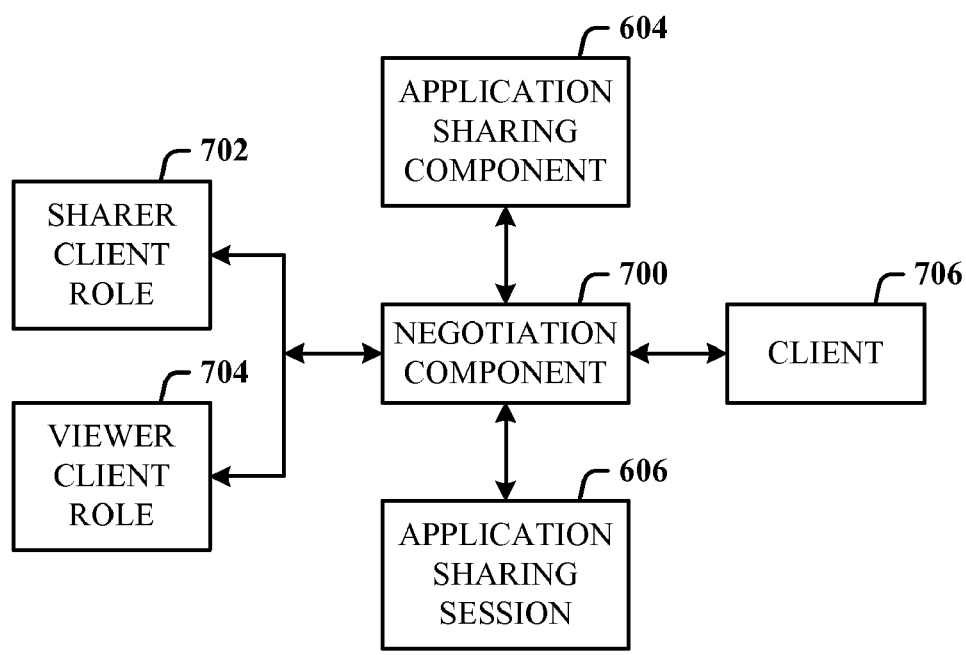
FIG. 7 illustrates a negotiation component as employed to define sharer and viewer roles.

FIG. 7 illustrates a role negotiation component 700 to define sharer and viewer roles. The negotiation component 700 negotiates a sharer client role 702 or a viewer client role 704 for a client 706 during establishment of the application sharing session 606 by the application sharing component 604. The client 706 in an application sharing session can either be a sharer or a viewer.

Figure 8:
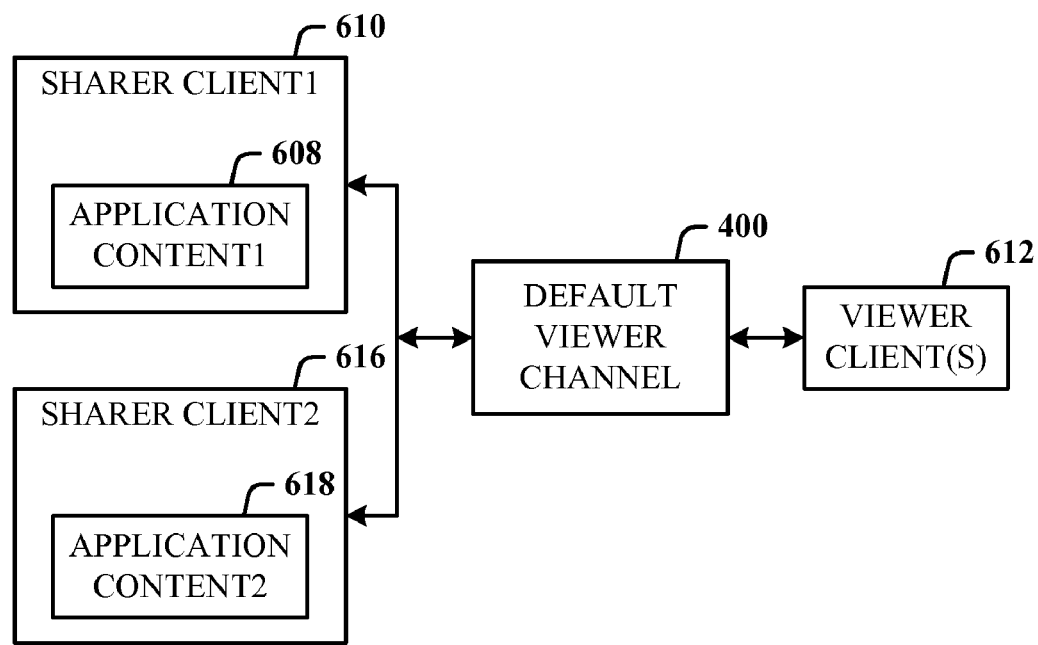
FIG. 8 illustrates a default channel for steaming application content.

The role negotiation component 700 encodes a role preference by the client 706 into the SDP offer sent as part of the session-establishing INVITE. The newly introduced SDP attribute can be named "x-application-sharing-role" where possible values of this attribute can be "sharer" and "viewer." The INVITE offer includes a preferred role with the SDP in the INVITE, and the answer includes a toggled value for this attribute on acceptance. This also provides a means for clients to reject an INVITE if the client does not choose to perform the requested role. Role negotiation communicates the preferred roles of the clients in the initial INVITE and provides the ability to determine and restrict the session to only one sharer in a peer-to-peer application sharing session FIG. 8 illustrates the default viewer channel 400 for steaming application content. Application content (608, 618) from the first sharer client 610 and application content 618 of the second sharer client 616 is streamed into the default viewer channel 400 in the manner described hereinabove and passed to the viewer client(s) 612 for presentation.

Figure 9:
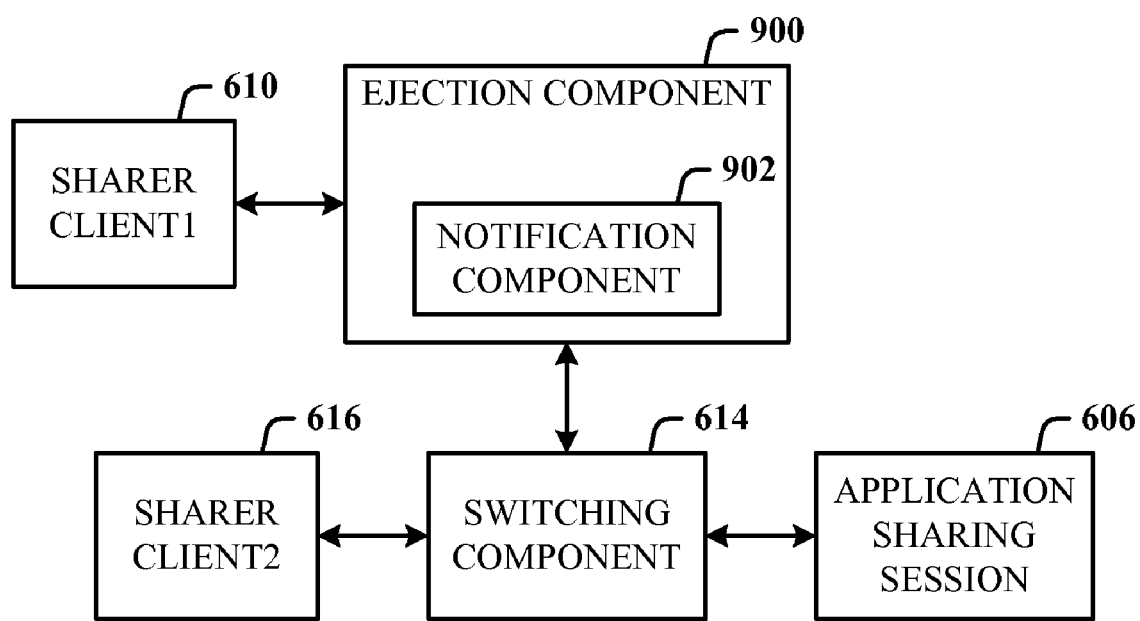
FIG. 9 illustrates an ejection component for ejecting a sharer from an application sharing session.

FIG. 9 illustrates an ejection component 900 for ejecting a sharer from the application sharing session 606. When the first sharer client 610 is finished with sharing application content during the application sharing session 606, the ejection component 900 ejects the first sharer client 610 from the application sharing session 606 when the second sharer client 616 enters the application sharing session 606. The ejection component 900 can also include a notification component 902 for notifying the first sharer client 610 of a reason for ejection from the application sharing session 606.

Put another way, in one embodiment a computer-implemented communications system is provided that includes the application sharing component for establishing an application sharing session via the multipoint control unit to expose application content of a first sharer client to viewer clients. The system also includes the switching component for seamlessly switching a role of one of the viewer clients to a role as a new sharer client to expose different application content to viewer clients during the application sharing session, and the restriction component for restricting the application sharing session to one sharer client so the viewer clients view only the different application content. A role negotiation component operates to negotiate a sharer client role or a viewer client role for a client during establishment of the application sharing session.

A default viewer channel is established into which application content from the first sharer client is streamed and from which the viewer clients receive the application content. The system further comprises an ejection component for ejecting the first sharer client from the application sharing session when the new sharer client enters the application sharing session. The ejection component can include a notification component for notifying the first sharer client of a reason for ejection from the application sharing session.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
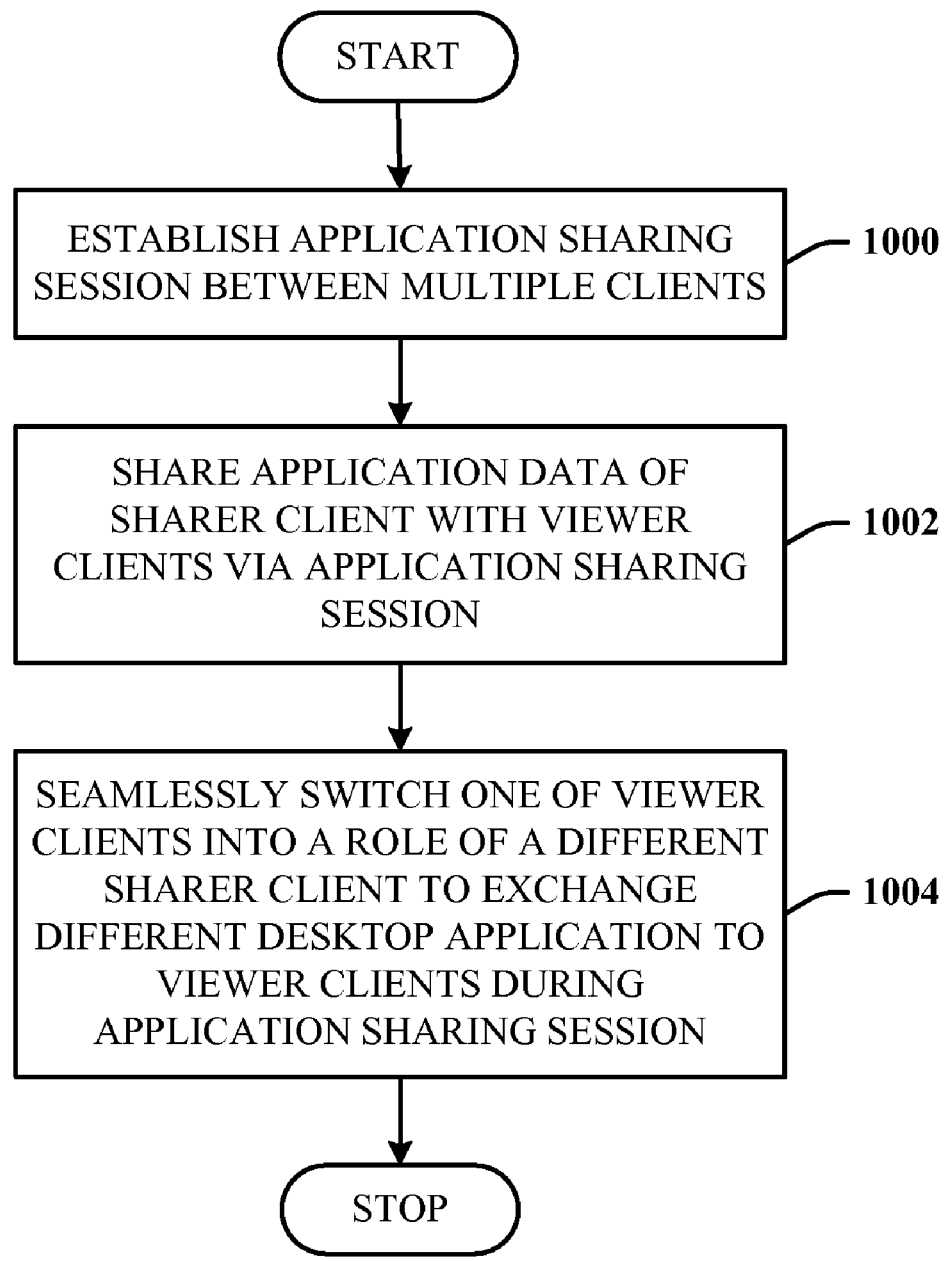
FIG. 10 illustrates a method of application sharing.

FIG. 10 illustrates a method of application sharing. At 1000, an application sharing session is established between multiple clients. The clients can be connected over an enterprise network or over the Internet, for example. The application sharing session can be used to share static content such as word processing documents or dynamic content, including audio, video, slideshows, etc. At 1002, application data of a sharer client is shared via the application sharing session. At 1004, a role of one of the viewer clients is seamless switched to a different sharer client to exchange a different desktop application to viewer clients during the application sharing session.

Figure 11:
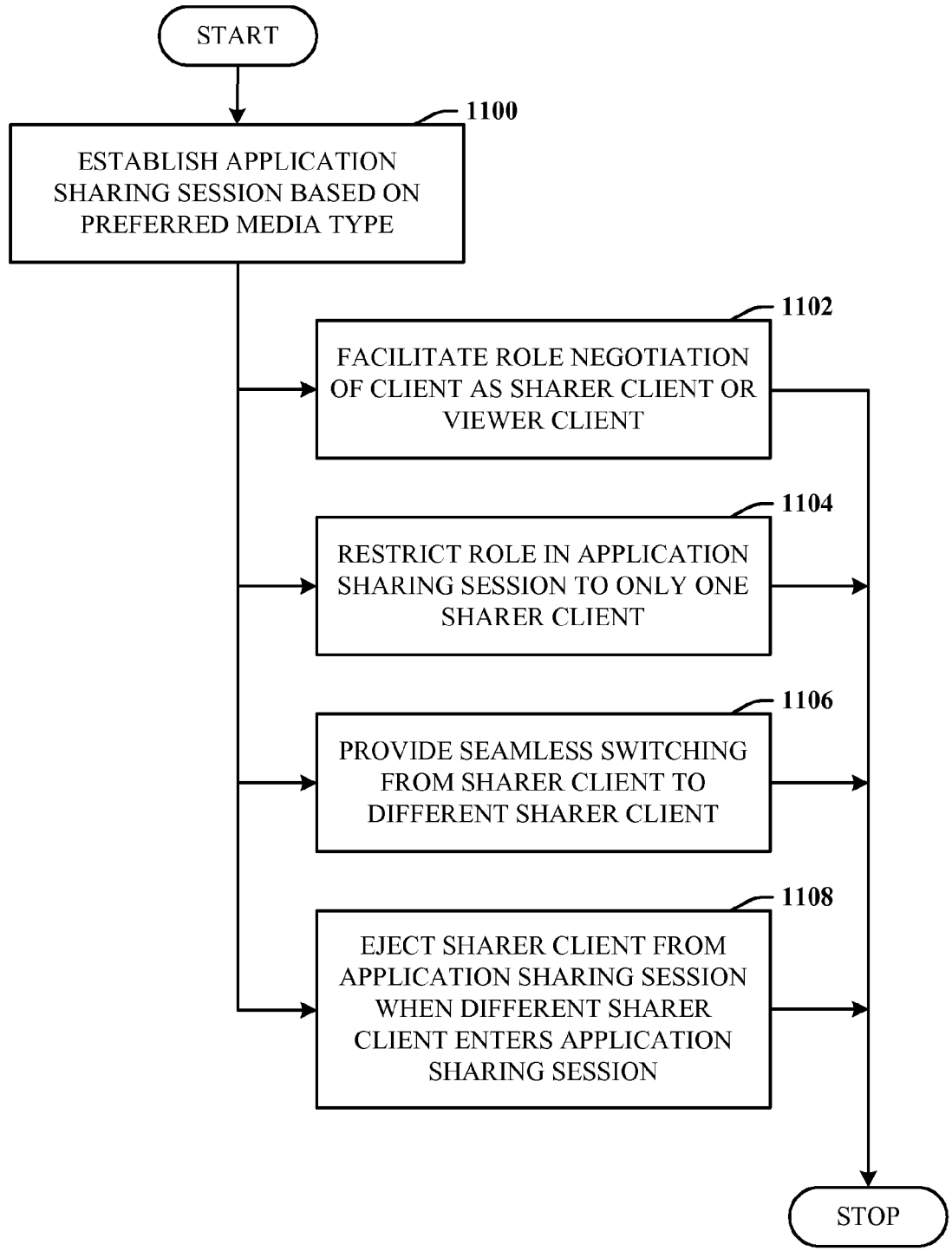
FIG. 11 illustrates further aspects in a method of application sharing.

FIG. 11 illustrates further aspects in a method of application sharing. At 1100, the application sharing session is established based on a preferred media type. At 1102, role negotiation of a client is facilitated as a sharer client or a viewer client. At 1104, a role in the application sharing session is restricted to only one sharer client. At 1106, seamless switching is provided from the sharer client to the different sharer client. At 1108, the sharer client is ejected from the application sharing session when the different sharer client enters the application sharing session.

Figure 12:
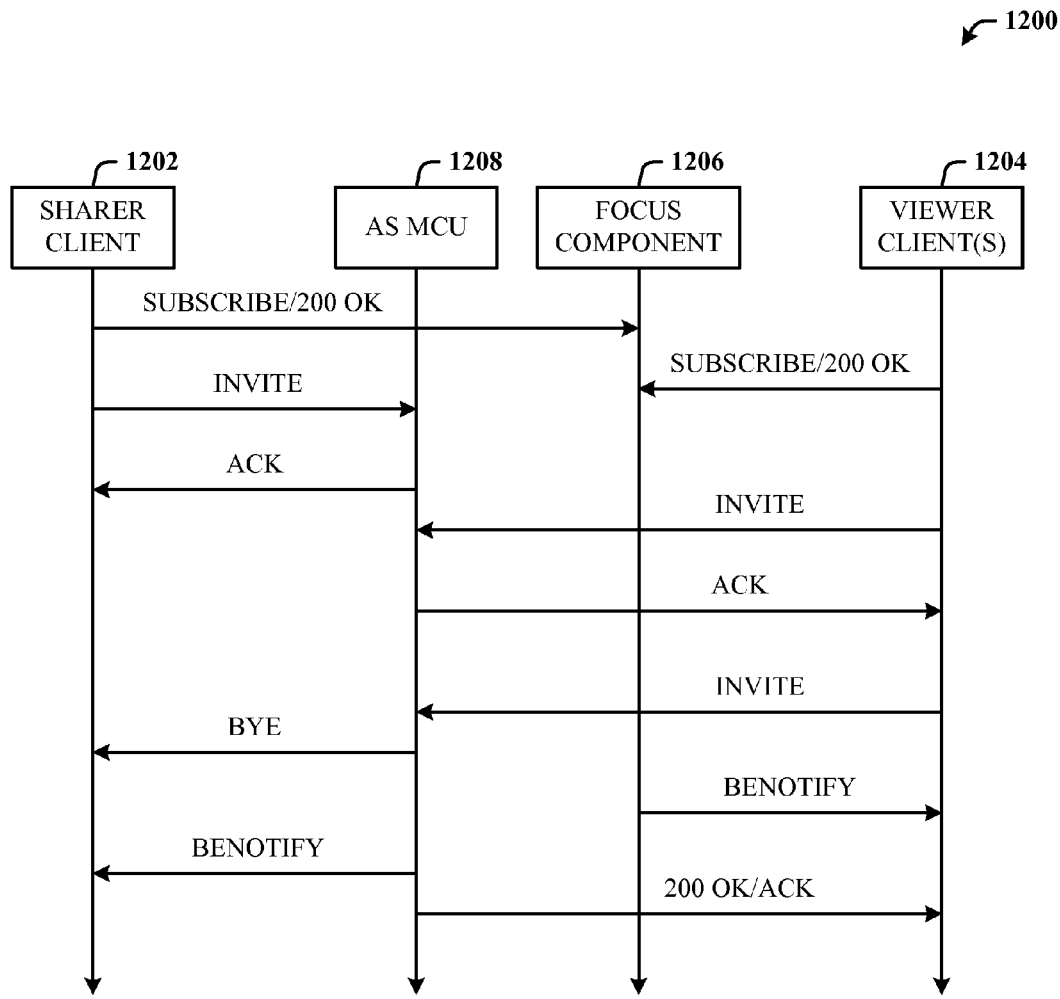
FIG. 12 illustrates a data and signal flow operation of a system of application sharing in a conference session.

FIG. 12 illustrates a data and signal flow operation of a system 1200 of application sharing in a conference session. The system 1200 includes a sharer client 1202, one or more viewer clients 1204, a focus component 1206 and an application sharing (AS) MCU 1208. The sharer client 1202 sends a Subscribe with a 200 OK message to the focus component 1206, and one of the viewer clients 1204 sends a Subscribe/200 OK message to the focus component 1206. The Subscribe can be in the form of a C3P (centralized conference control protocol) conference document.

The focus component 1206 coordinates logistics of a conference, including the sharer of the conference, number of people (clients) in the conference, defining client roles, the media of the shared applications, including audio, video, off-setting. These logistics are aggregated by the focus component 1206 and signed out to the clients in the conference. This way, each person can know what the other people are doing.

The sharer client 1202 sends an Invite to the AS MCU 1208, and receives a 200 OK/acknowledgement (ACK) back. Similarly, the viewer client 1204 sends an Invite to the AS MCU 1208, and receives a 200 OK/ACK back. The SDP inside the INVITE body contains the intended role of the client in the AS conference (e.g., for the sharer role, the SDP includes "x-application-sharing-role: sharer", and for the viewer role, the SDP includes "x-application-sharing-role: viewer").

Upon establishment of the application sharing session, the AS MCU 1208 acts as the receiver of media content from the sharer client 1202 and streams the media content to the default viewer channel. If the intended role of a client is "viewer," the AS MCU 1208 sends to the viewer client 1204 whatever media is currently being streamed to the default viewer channel. The default viewer channel enables the viewers to see the latest sharer media stream.

During the conference, the focus component 1206 fans out conference related information documents to all the conference participants, including the sharer client 1202 and the viewer clients 1204. The information includes data about each user in the conference and can be presented in the form of XML documents. When the sharer client 1202 joins the conference, the focus component 1206 sends the user's AS activity in the conference in BENOTIFY messages to all participants in the conference. The following is an example of the information:

```
<media id="1">
    <type>applicationsharing</type>
    <src-id>1</src-id>
    <status>sendonly</status>
    <cis:separator />
    <msci:media-state>joining</msci:media-state>
    <msci:session-id>1</msci:session-id>
</media>
```

The "sendonly" status implies that the client only sends AS media, that is, the client is the sharer client 1202 in the conference. The "media-state" implies that the user has successfully joined the AS MCU 1208.

Similarly when the viewer client 1204 joins a conference, the focus component 1206 sends the following information, for example, to the conference listeners:

```
<media id="2">
    <type>applicationsharing</type>
    <src-id>1</src-id>
    <status>recvonly</status>
    <cis:separator />
    <msci:media-state>connected</msci:media-state>
    <msci:session-id>1</msci:session-id>
</media>
```

The "recvonly" status implies that the client only receives AS media, that is, the client is the viewer client 1204 in the conference.

When a client (e.g., the old viewing client 1204) wants to start sharing, the client sends the INVITE message to the AS MCU 1208 with the sharer role specified in the SDP (e.g., "x-applicationsharing-role: sharer"). Before the AS MCU 1208 can accept the INVITE, it has to terminate its session with the "old" sharer client (e.g., sharer client 1202), since there can only be one sharer in a conference at a time. Hence, the AS MCU 1208 sends a BYE message to the old sharer client 1204. The BYE message includes an ms-diagnostics header containing code which denotes that the BYE was sent by the AS MCU 1208 based on a new sharer client becoming active in the conference (e.g., BYE ms-diagnostics: New_Sharer_Joined_Conference).

Viewers in a conference typically leave when receiving a NOTIFY from the focus component 1206 that a sharer has left. To ensure that the existing viewers do not leave the conference during the small window of time after the AS-MCU 1208 has sent the BYE message to the old sharer client, the AS-MCU 1208 sends BENOTIFY messages to all clients via the focus component 1206 to indicate that there is a new sharer in the process of joining the AS-MCU 1208. This can be achieved by the "joining" media-state in the BENOTIFY messages:

```
<media id="3">
    <type>applicationsharing</type>
    <src-id>1</src-id>
```

-continued
```
    <status>sendonly</status>
    <cis:separator />
    <msci:media-state>joining</msci:media-state>
    <msci:session-id>1</msci:session-id>
</media>
```

The BENOTIFY messages tell the other clients in the conference that a new sharer is joining the conference and is in the process of taking over. This ensures that the existing viewers do not leave the conference, since the viewers may delay leaving as long as there is at least one sharer in the conference. Afterwards, the AS MCU 1208 sends a 200 OK message to the new sharer confirming the new status and receives an ACK in return.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 13:
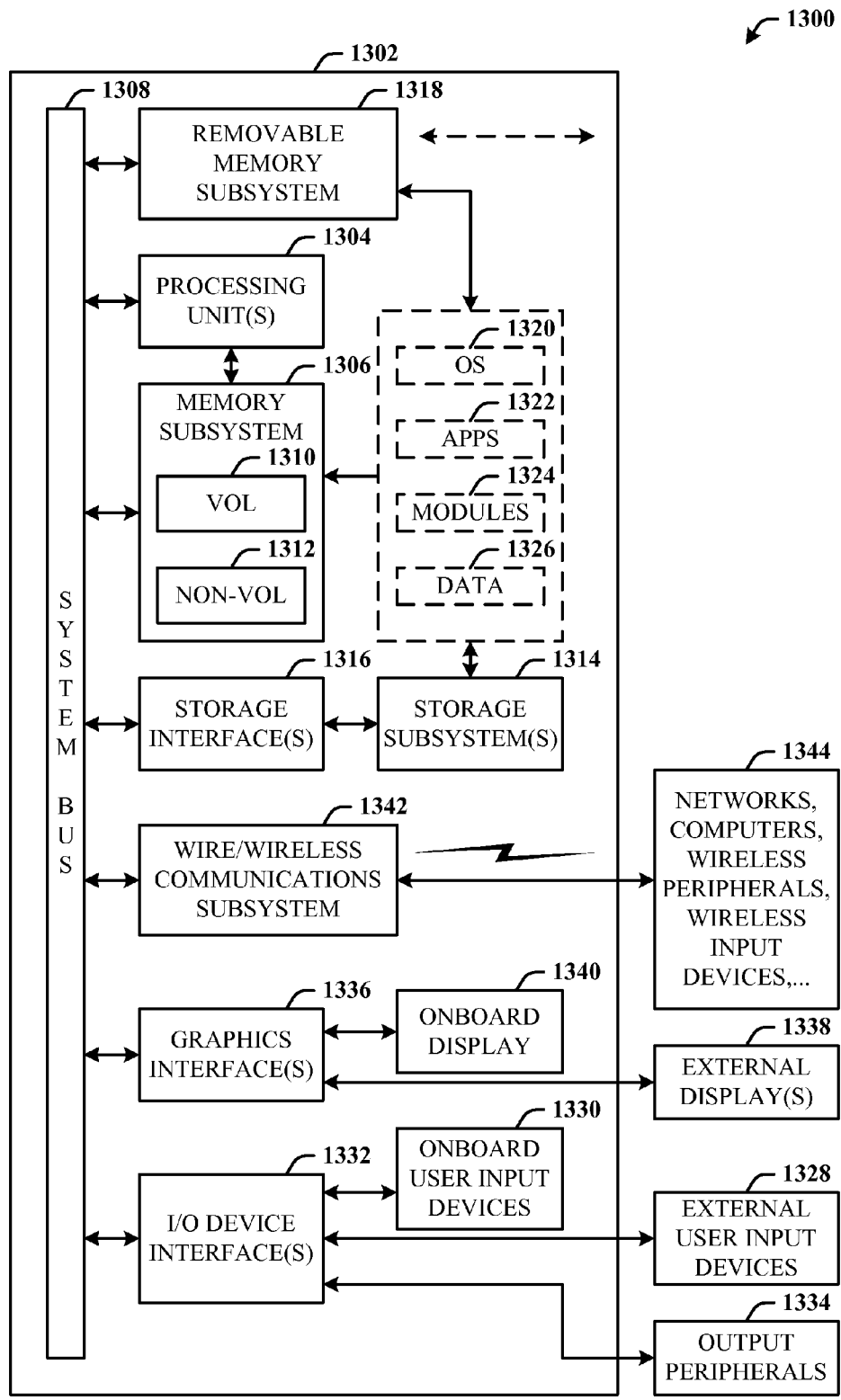
FIG. 13 illustrates a block diagram of a computing system operable to execute the application sharing in accordance with the disclosed architecture.

Referring now to FIG. 13, there is illustrated a block diagram of a computing system 1300 operable to execute application sharing in accordance with the disclosed architecture. In order to provide additional context for various aspects thereof, FIG. 13 and the following discussion are intended to provide a brief, general description of the suitable computing system 1300 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1300 for implementing various aspects includes the computer 1302 having processing unit(s) 1304, a system memory 1306, and a system bus 1308. The processing unit(s) 1304 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1306 can include volatile (VOL) memory 1310 (e.g., random access memory (RAM)) and non-volatile memory (NON-VOL) 1312 (e.g., ROM, EPROM, EEPROM, etc.). A basic input/output system (BIOS) can be stored in the non-volatile memory 1312, and includes the basic routines that facilitate the communication of data and signals between components within the computer

1302, such as during startup. The volatile memory 1310 can also include a high-speed RAM such as static RAM for caching data.

The system bus 1308 provides an interface for system components including, but not limited to, the memory subsystem 1306 to the processing unit(s) 1304. The system bus 1308 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1302 further includes storage subsystem(s) 1314 and storage interface(s) 1316 for interfacing the storage subsystem(s) 1314 to the system bus 1308 and other desired computer components. The storage subsystem(s) 1314 can include one or more of a hard disk drive (HDD), a magnetic floppy disk drive (FDD), and/or optical disk storage drive (e.g., a CD-ROM drive DVD drive), for example. The storage interface(s) 1316 can include interface technologies such as EIDE, ATA, SATA, and IEEE 1394, for example.

One or more programs and data can be stored in the memory subsystem 1306, a removable memory subsystem 1318 (e.g., flash drive form factor technology), and/or the storage subsystem(s) 1314, including an operating system 1320, one or more application programs 1322, other program modules 1324, and program data 1326. Generally, programs include routines, methods, data structures, other software components, etc., that perform particular tasks or implement particular abstract data types.

The aforementioned applications 1322, modules 1324, and data 1326 can include the computer-implemented communications system 100, the media component 102, the application sharing session 104, the clients 106, the negotiation component 108, the media connection 110, and the supported media information 112 of FIG. 1, the preferred media type 200, the format 202, and the set of formats 204 of FIG. 2, the client 300, the sharer 302, the viewer 304, and the restriction component 306 of FIG. 3, the default viewer channel 400 and the application sharing media 402 of FIG. 4, the most current sharer media 500 and the viewers 502 of FIG. 5. The aforementioned applications 1022, modules 1024, and data 1026 can also include the computer-implemented communications system 600, the multipoint control unit 602, the application sharing component 604, the application sharing session 606, the application content 608, the sharer client 610, the viewer clients 612, the switching component 614, the different sharer client 616, the different application content 618, and the restriction component 620 of FIG. 6. The aforementioned applications 1022, modules 1024, and data 1026 can additionally include the role negotiation component 700, the sharer client role 702, the viewer client role 704, and the client 706 of FIG. 7, the default viewer channel 800 of FIG. 8, the ejection component 900 and the notification component 902 of FIG. 9, and the methods of FIGS. 10-12 for example.

All or portions of the operating system 1320, applications 1322, modules 1324, and/or data 1326 can also be cached in memory such as the volatile memory 1310, for example. It is to be appreciated that the disclosed architecture can be implemented with various commercially available operating systems or combinations of operating systems (e.g., as virtual machines).

The storage subsystem(s) 1314 and memory subsystems (1306 and 1318) serve as computer readable media for volatile and non-volatile storage of data, data structures, computer-executable instructions, and so forth. Computer readable media can be any available media that can be accessed by the computer 1302 and includes volatile and non-volatile media, removable and non-removable media. For the computer 1302, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1302, programs, and data using external user input devices 1328 such as a keyboard and a mouse. Other external user input devices 1328 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1302, programs, and data using onboard user input devices 1330 such a touchpad, microphone, keyboard, etc., where the computer 1302 is a portable computer, for example. These and other input devices are connected to the processing unit(s) 1304 through input/output (I/O) device interface(s) 1332 via the system bus 1308, but can be connected by other interfaces such as a parallel port, IEEE 1394 serial port, a game port, a USB port, an IR interface, etc. The I/O device interface(s) 1332 also facilitate the use of output peripherals 1334 such as printers, audio devices, camera devices, and so on, such as a sound card and/or onboard audio processing capability.

One or more graphics interface(s) 1336 (also commonly referred to as a graphics processing unit (GPU)) provide graphics and video signals between the computer 1302 and external display(s) 1338 (e.g., LCD, plasma) and/or onboard displays 1340 (e.g., for portable computer). The graphics interface(s) 1336 can also be manufactured as part of the computer system board.

The computer 1302 can operate in a networked environment (e.g., IP) using logical connections via a wired/wireless communications subsystem 1342 to one or more networks and/or other computers. The other computers can include workstations, servers, routers, personal computers, microprocessor-based entertainment appliance, a peer device or other common network node, and typically include many or all of the elements described relative to the computer 1302. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1302 connects to the network via a wired/wireless communication subsystem 1342 (e.g., a network interface adapter, onboard transceiver subsystem, etc.) to communicate with wired/wireless networks, wired/wireless printers, wired/wireless input devices 1344, and so on. The computer 1302 can include a modem or has other means for establishing communications over the network. In a networked environment, programs and data relative to the computer 1302 can be stored in the remote memory/storage device, as is associated with a distributed system. It will be appreciated that the network connections shown are exemplary and other means of establishing a communications link between the computers can be used.

The computer 1302 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 14:
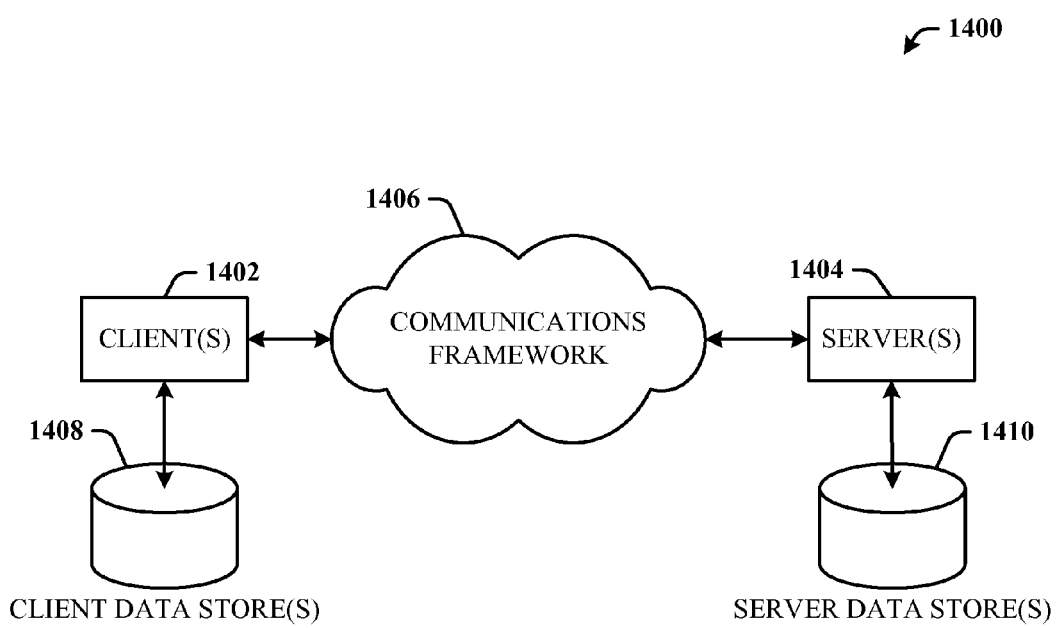
FIG. 14 illustrates an exemplary computing environment operable to provide application sharing.

Referring now to FIG. 14, there is illustrated a schematic block diagram of a computing environment 1400 that provides application sharing. The environment 1400 includes one or more client(s) 1402. The client(s) 1402 can be hardware and/or software (e.g., threads, processes, computing devices). The client(s) 1402 can house cookie(s) and/or associated contextual information, for example.

The environment 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The environment 1400 includes a communication framework 1406 (e.g., a global communication network such as the Internet) that can be employed to facilitate communications between the client(s) 1402 and the server(s) 1404.

Communications can be facilitated via a wire (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communications system, comprising:
    a media component for establishing an application sharing session between multiple clients;
    a switching component for seamlessly switching a role of at least one of the multiple clients between a viewer and a sharer to enable different clients to share application sharing media to the respective others of the multiple clients during the application sharing session;
    a negotiation component for establishing a media connection of a client to the session, the media connection is established based on a supported media format of the application sharing media communicated between the media component and the client; and
    a processor that executes computer-executable instructions associated with at least one of the media component, the switching component, or the negotiation component.

2. The system of claim 1, wherein the supported media format includes a preferred media type in which to establish the connection.

3. The system of claim 2, wherein the preferred media type includes a format selected from a set of formats having different attributes, the preferred media type is communicated as part of an initial invite.

4. The system of claim 1, wherein the negotiation component facilitates role negotiation of a client as a sharer or a viewer.

5. The system of claim 4, further comprising a restriction component for restricting a role in a peer-to-peer session to only one sharer.

6. The system of claim 1, wherein the media component establishes a default viewer channel for communicating application sharing media to the clients.

7. The system of claim 1, wherein the media component streams a most current sharer media to viewers of the session.

8. The system of claim 1, wherein the media component is a multipoint control unit or a peer-to-peer client communications component.

9. The system of claim 1, wherein the multiple clients comprise at least one of network clients or web-access clients.

10. A computer-implemented communications system, comprising:
    an application sharing component for establishing an application sharing session via a multipoint control unit to expose application content of a first sharer client to viewer clients;
    a switching component for seamlessly switching a role of one of the viewer clients to a role as a new sharer client to expose different application sharing media to the respective others of the viewer clients during the application sharing session;
    a restriction component for restricting the application sharing session to one sharer client so the viewer clients view only the different application sharing media; and
    a processor that executes computer-executable instructions associated with at least one of the application sharing component, the switching component, or the restriction component.

11. The system of claim 10, further comprising a role negotiation component for negotiating a sharer client role or a viewer client role for a client during establishment of the application sharing session.

12. The system of claim 10, further comprising a default viewer channel into which application content from the first sharer client is streamed and from which the viewer clients receive the application content.

13. The system of claim 10, further comprising an ejection component for ejecting the first sharer client from the application sharing session when the new sharer client enters the application sharing session.

14. The system of claim 13, wherein the ejection component further comprises a notification component for notifying the first sharer client of a reason for ejection from the application sharing session.

15. A computer-implemented method of communications, comprising acts of:
   establishing an application sharing session between multiple clients;
   sharing application sharing media of a sharer client with viewer clients via the application sharing session;
   seamlessly switching one of the viewer clients into a role of a different sharer client to exchange a different desktop application sharing media to the respective others of the multiple viewer clients during the application sharing session; and
   utilizing a processor to execute instructions stored in memory to perform at least one of the acts of establishing, sharing, or seamlessly switching.

16. The method of claim 15, further comprising establishing the application sharing session based on a preferred media type.

17. The method of claim 15, further comprising facilitating role negotiation of a client as a sharer client or a viewer client.

18. The method of claim 15, further comprising restricting a role in the application sharing session to only one sharer client.

19. The method of claim 15, further comprising ejecting the sharer client from the application sharing session when the different sharer client enters the application sharing session.

20. The method of claim 19, further comprising notifying the ejected sharer client of a reason for being ejected.

\* \* \* \* \*